United States Patent [19]
Edens

[11] Patent Number: 5,279,732
[45] Date of Patent: Jan. 18, 1994

[54] FLUID CONDITIONING DEVICE

[76] Inventor: Jeffrey I. Edens, 16192 Bimini, Huntington Beach, Calif. 92649

[21] Appl. No.: 856,104

[22] Filed: Mar. 23, 1992

[51] Int. Cl.⁵ .............................................. B01D 29/11
[52] U.S. Cl. .................................. 210/232; 210/443; 210/445; 210/452; 210/453
[58] Field of Search ............ 210/232, 348, 406, 416.1, 210/435, 436, 443, 444, 445, 451, 452–455

[56] References Cited
U.S. PATENT DOCUMENTS 3,774,769 11/1973 Smith .................................. 210/232
4,728,421 3/1988 Moddemeyer ...................... 210/232

Primary Examiner—Frank Sever
Attorney, Agent, or Firm—Boniard I. Brown

[57] ABSTRACT

A fluid conditioning device having a housing containing a fluid inlet and outlet and a removable fluid conditioner through which fluid passes from the inlet to the outlet and which removes matter from and/or adds matter to the fluid, and an improved seal between the housing and fluid conditioner for blocking passage of unconditioned fluid from the inlet to the outlet. The housing is constructed and arranged to receive different types of fluid conditioners, such as a porous cartridge which may serve to filter solids from and/or add a substance to the fluid, a filter bag and basket combination, and a reversible osmosis cartridge for removing molecular constituent form a fluid solution, such as the saline constituent from sea water.

25 Claims, 4 Drawing Sheets

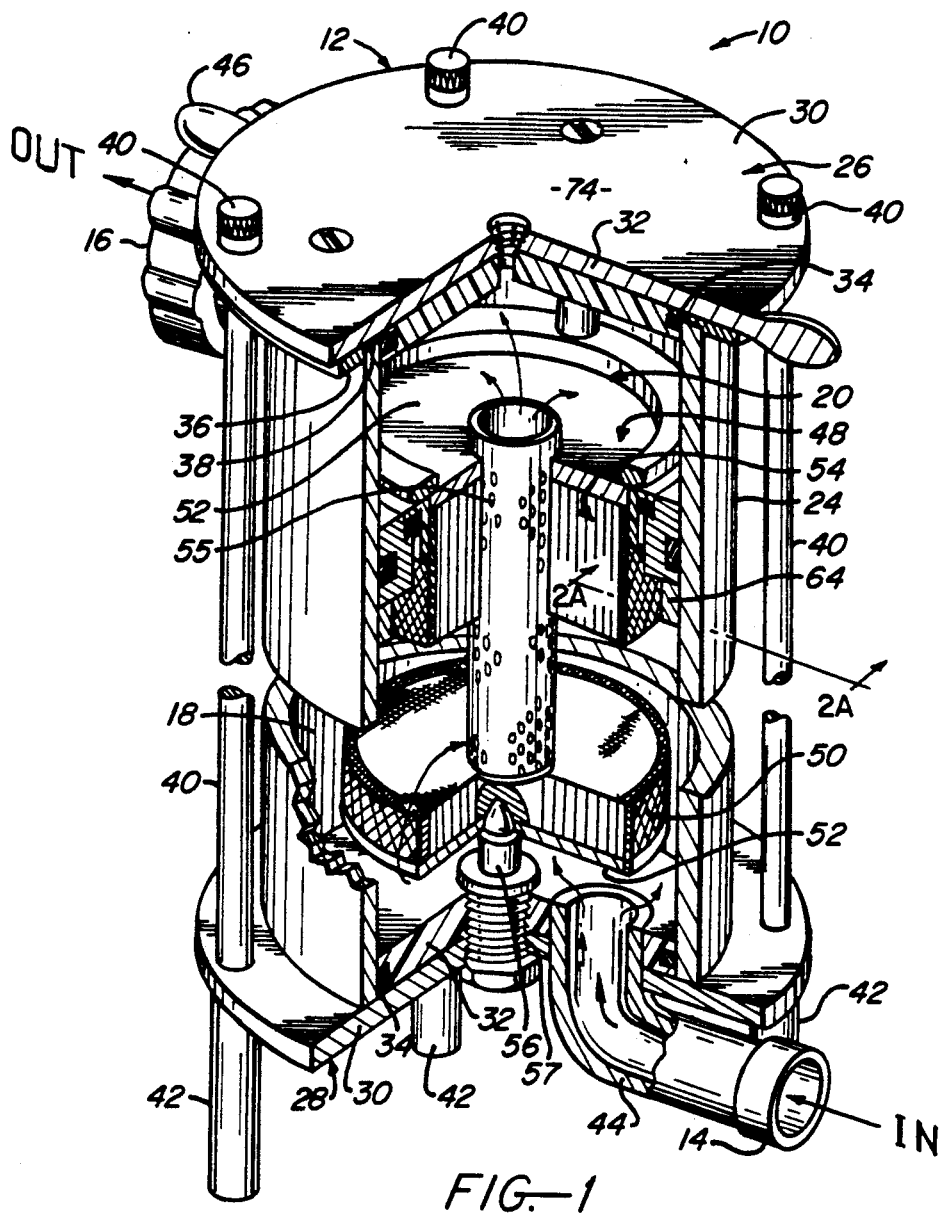
FIG.—1
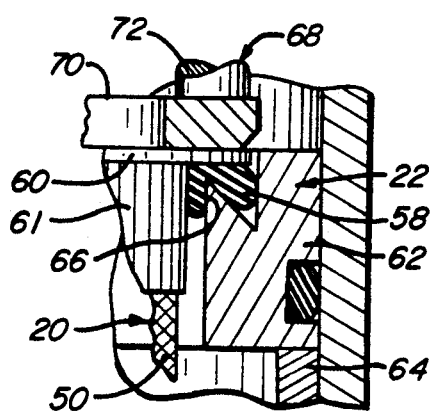
FIG.—2A
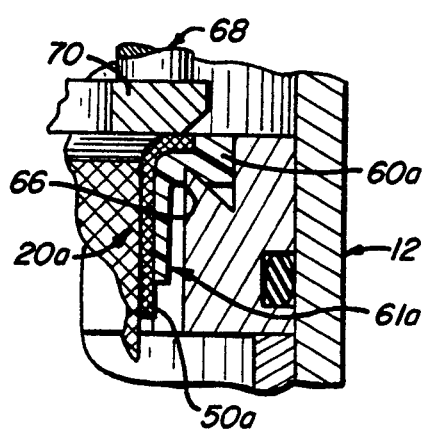
FIG.—2B

FLUID CONDITIONING DEVICE

BACKGROUND OF THE INVENTION

1. Field of the Invention

This invention relates generally to the fluid conditioning art and more particularly to an improved fluid conditioning device for conditioning a fluid by filtering matter from the fluid, adding matter to the fluid, or both removing matter from and adding other matter to the fluid.

2. Prior Art

According to its broader aspects, this invention is concerned with fluid conditioning devices of the class characterized by a housing having a fluid inlet and outlet, a fluid passage communicating the inlet and outlet, and a fluid conditioner within the passage through which fluid flows from the inlet to the outlet. The fluid conditioner may be designed to condition the fluid by adding matter, such as a treatment chemical, to the fluid, removing matter, such as contaminants, from the fluid, or both adding matter to and removing matter from the fluid. For example, one type of fluid conditioning device of the class described is a filter which removes solids from a fluid. Another type of fluid conditioning device is a reverse osmosis device that separates a molecular constituent from a solution, such as the saline constituent from sea water. Yet another type of fluid conditioning device adds a substance to the fluid.

This invention is primarily concerned with fluid conditioning devices of the first two types just mentioned, that is, solid matter filtering devices and reverse osmosis devices, and will be described mostly in this context. For convenience, these conditioning devices are referred to herein generically in places as fluid filtering devices or simply filters. It will become evident as the description proceeds, however, that the invention contemplates within its scope a fluid conditioning device which adds matter to a fluid instead of or in addition to removing matter from the fluid.

The fluid filtering art is very highly developed and replete with a vast assortment of fluid filters for a wide variety of filtering purposes. Among the patents in this field are the following: U.S. Pat. Nos. 4,402,828, 4,253,959, 4,388,191, 3,771,664, 4,966,697, 4,935,128, 4,157,964, 5,006,243, 4,986,912, 4,664,798, 4,204,966, 4,133,769, 4,021,354, 3,675,776. Of these patents, the first two listed are believed to be the most pertinent to this invention.

One of the major problems involved in the design, fabrication, and use of fluid conditioning devices of the class described is sealing the internal fluid conditioner to the housing to prevent passage or leakage of unconditioned fluid between the conditioner and the housing. This problem is particularly troublesome in fluid conditioning devices having fluid conditioners which are removable for servicing or replacement and those conditioning devices which handle high pressure fluid. While a wide variety of sealing arrangements have been devised for this purpose, none are totally satisfactory, especially for use in high pressure filtering devices having removable internal filter units.

SUMMARY OF THE INVENTION

This invention provides an improved fluid conditioning device of the character described comprising an outer housing and an internal fluid conditioner situated within a fluid passage communicating the housing inlet and outlet. One improvement feature of the device resides in improved seal arrangements for sealing the internal fluid conditioner to the housing to prevent passage of unconditioned fluid between the housing and conditioner. Another improvement feature resides in a unique housing for the conditioning device which is devoid of internal recesses and the like that would tend to collect entrained matter in the fluid passing through the housing and which may be used with different types of fluid conditioners, such as filters for filtering solids from a fluid, a reverse osmosis conditioner for removing a molecular constituent from a fluid solution, and a fluid treatment conditioner for adding a substance to a fluid.

The improved seal arrangements of the invention comprise an external annular sealing lip means on the fluid conditioner and an internal annular sealing shoulder means within the housing which extend about the conditioner between the latter and surrounding wall of the fluid passage and which are urged into fluid sealing contact with one another or with an intervening deformable seal ring by a hold-down or clamp member. One preferred seal arrangement has a relatively sharp knife-like annular sealing edge on the sealing shoulder and a deformable seal ring which is compressed between this knife edge and the conditioner lip. In another preferred seal arrangement, the knife sealing edge engages the conditioner lip directly. In yet another preferred seal arrangement, the sealing shoulder is a discrete ring which is supported on a fixed internal shoulder in the housing, and a deformable seal ring is disposed between planar sealing surfaces on the conditioner lip and the shoulder ring.

The preferred housing of the fluid conditioning device comprises a generally tubular body having open ends closed by end closures, and tie rods joining these end closures. These tie rods perform the dual function of retaining the tubular body and end closures in assembled relation and urging the hold down or clamp means against the conditioner sealing means. The tubular body forms the fluid passage which contains the internal fluid conditioner.

BRIEF DESCRIPTION OF THE DRAWINGS

FIG. 1 is a perspective view, partly in section, of a fluid conditioning device, in this case a fluid filter, according to the invention;

FIG. 2A is an enlarged section taken on Line 2A—2A in FIG. 1 illustrating the details of a fluid seal according to the invention embodied in the illustrated device;

FIG. 2B is a section similar to FIG. 2A through a modified fluid seal according to the invention which may be utilized in the fluid conditioning device of FIG. 1;

DESCRIPTION OF THE PREFERRED EMBODIMENT

Figure 2C:
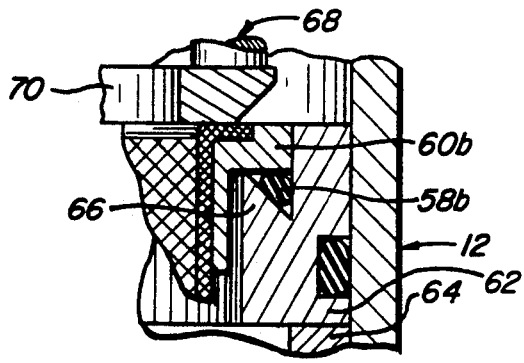
FIG. 2C is a section similar to FIG. 2A through a further modified fluid seal according to the invention which may be utilized in the fluid conditioning device of FIG. 1.

Referring now to these drawings and first to FIGS. 1 and 2A, the illustrated fluid conditioning device 10 comprises a housing 12 having a fluid inlet 14, a fluid outlet 16, a fluid passage 18 communicating the inlet and outlet, and a fluid conditioner 20 within the passage between said inlet and outlet. As will be explained in more detail, fluid entering the inlet 14 flows through the conditioner 20 to the outlet 16 and is conditioned in a certain way as it passes through the conditioner. The fluid conditioner 20 is sealed to the housing 12 by improved fluid sealing means 22 according to this invention in a way which prevents passage or leakage of unconditioned fluid between the housing and conditioner. It will be seen from the ensuing description that the housing 12 has a pressure vessel construction which cooperates with the sealing means 22 to maintain a fluid tight seal between the housing and fluid conditioner 20 even at relatively high inlet fluid pressures.

As mentioned earlier and will become evident as the description proceeds, the fluid conditioning device of this invention may be designed to condition fluid in various ways including either or both removing matter from the fluid and adding matter to the fluid. The invention is particularly concerned, however, with conditioning the entering fluid by removing contaminants from the fluid and will be described in this context. The fluid conditioning device 10, for example, is a filter for separating solids from the fluid passing through the device.

Referring now in more detail to the illustrated fluid conditioning or filtering device 10, the housing 12 includes a tubular body 24 in the form of a cylinder having normally upper and lower ends closed by normally upper and lower end closures 26, 28. Each end closure comprises an outer disc shaped plate 30 substantially larger in diameter than the tubular body 24 and an inner disc shaped plate 32 concentrically bonded or otherwise fixed to the inner side of the outer plate. The inner plates 32 are sized to fit closely but removably in the ends of the tubular body and are sealed to the body by O-rings 34.

The outer plate 30 of the lower end closure 28 seats against and projects edgewise beyond the lower end of the body. Coaxially disposed between the upper end of the body 24 and the outer plate 30 of the upper end closure 26 is a ring 36 of about the same outside diameter as the outer plate. This ring has a radially inner lip 38 of reduced axial thickness which seats against the upper end of the body 24 and an annular shoulder which radially engages the body to maintain the ring centered on the body. The outer plate 30 of the upper end closure 26 seats against the upper side of the ring. The upper closure plate 30 and ring 36 project edgewise beyond the upper end of the body.

Extending axially of the body 24 between the end closures 26, 28 are tie rods 40 having threaded ends. The upper threaded ends of these rods extend through openings in the ring 36 and the projecting outer edge portion of the upper end closure plate 30. The lower threaded ends of the rods extend through openings in the projecting outer edge portion of the lower end closure plate 30. Threaded on the ends of the tie rods above the upper end closure and below the lower end closure are nuts 40, 42 which can be tightened to hold the end closures 26, 28 in firm fluid sealing contact with the ends of the tubular housing body 24 and thereby seal these ends against even relatively high fluid pressure in the housing 12. The lower nuts 42 are elongated to form legs for supporting the housing with its lower end closure 28 in an elevated position.

The central opening through the tubular housing body 24 forms the fluid passage 18. The fluid inlet 14 opens through the lower end closure 28 to the lower end of the passage and is formed by a generally L-shaped inlet fitting 44 having one end fixed and sealed to the lower end closure. The opposite end of this inlet fitting extends outwardly beyond one side of the housing, as shown. The housing legs 42 provide appropriate clearance for the inlet fitting between the lower closure 28 and the surface on which the housing 12 is supported. The fluid outlet 16 opens through the upper end of the tubular body 24 to the upper end of the fluid passage 18 and is formed by an outlet fitting 46 fixed and sealed to the wall of the tubular body.

The internal fluid conditioner 20 of the illustrated fluid conditioning device 10 is a generally cylindrical filter cartridge. This cartridge has a relatively rigid filter body 48 including a porous cylindrical side wall 50 and non-porous end walls 52. The cartridge contains a mass of porous filter material 54 surrounding a central perforate product tube 55. This product tube extends coaxially through the cartridge and through its upper end wall 52. The porous filter material contains minute pores or passages which open outwardly through the side wall 50 to the filter passage 18 and inwardly through openings in the product tube 55 to the tube interior. The upper end of the tube opens to the fluid passage 18 above the filter cartridge. The pores in the filter material 54 are sized to pass the fluid being conditioned and block solids entrained in the fluid. The filter cartridge 20 is concentrically positioned within the fluid passage 18 between the fluid inlet 14 and outlet 16 and in radially spaced relation to the wall of the tubular housing body 24. As explained below, the improved seal means 22 of the invention centers the upper end of the filter cartridge 20 within and seals this cartridge end to the surrounding cylindrical wall of the housing body 24. The lower end of the cartridge is centered by engagement with an upstanding centering pin 56 threaded in a hole 57 in the lower end plate.

The improved seal means 22 of this invention seals the internal fluid conditioner (i.e., filter cartridge) 20 to the surrounding tubular body 24 of the housing 12 to prevent passage of unconditioned (unfiltered) fluid from the inlet 14 to the outlet 16. Simply stated, this seal means comprises annular sealing members circumferentially surrounding and disposed in fluid sealing relation with the cartridge and housing body, respectively, and means for urging these sealing members into mutual fluid sealing contact. In the preferred seal means 22 illustrated, in FIGS. 1 and 2A, one sealing member has a knife-like sealing edge, another seal member is deformable, and the sealing members are urged into contact with a force sufficient to indent the knife-like sealing edge into the deformable sealing member to form a fluid tight seal between the housing and cartridge.

Referring in more detail to the preferred embodiment illustrated in FIGS. 1 and 2A, the deformable sealing member of the seal means 22 is a resilient seal ring 58 which surrounds the upper end of the filter cartridge 20 immediately below an outwardly projecting circumferential lip or flange 60 on a collar 61 surrounding and fixed to the upper end of the cartridge side wall 50. The second annular sealing member of the seal means 22 comprises an annular shoulder member or ring 62 which fits slidably within the tubular body 24 of the housing 12 and is sealed to the surrounding wall of the body by the illustrated O-ring. The shoulder ring 62 seats against an internal annular shoulder 64 fixed within the housing body 24. This housing shoulder positions the shoulder ring 62, and thereby also the filter cartridge 20, axially in the housing body. Entering the upper side of the shoulder ring 62 along its radially inner circumference is a coaxial annular groove of V-shape in cross-section. This groove intersects the inner circumferential surface of the shoulder ring to form along the inner circumference of the ring an annular rib which tapers upwardly to an annular relatively sharp, knife-like sealing edge 66. The deformable seal ring 58 is disposed between the cartridge flange 60 and the sealing edge 66.

Above the filter cartridge 20 are hold-down or clamping means 68 which press downwardly on the upper end of the filter cartridge 20 to compress the deformable seal ring 58 between the cartridge flange 60 and the knife sealing edge 66 on the cartridge shoulder ring 62 which rests on the internal housing shoulder 64. The sealing edge is thereby indented into the deformable seal ring, as shown best in FIG. 2A, to form a firm fluid-tight seal between the filter cartridge 20 and the surrounding housing body 24. Indenting of the sealing edge 66 into the deformable seal ring 58 also firmly captivates the seal ring against displacement from its illustrated sealing position by fluid pressure across the ring. The clamping means 68 comprises a hold-down or clamp ring 70 on the inner side of the upper housing body end closure 30 and support rods 72 extending between and bolted or otherwise secured to the ring and the upper housing end closure. The rods 72 are sized in length so that when the upper end closure is secured to the upper end of the tubular housing body 24 by the tie rods 40, the clamp ring 70 presses downwardly on the filter cartridge 20 with sufficient force to indent the sealing edge 66 into the cartridge seal ring 58 in the manner shown. The filter cartridge is then coaxially supported in and sealed to the housing body 24 with the side wall 50 of the cartridge radially spaced from the housing body below the inner housing shoulder 64.

Figure 3:
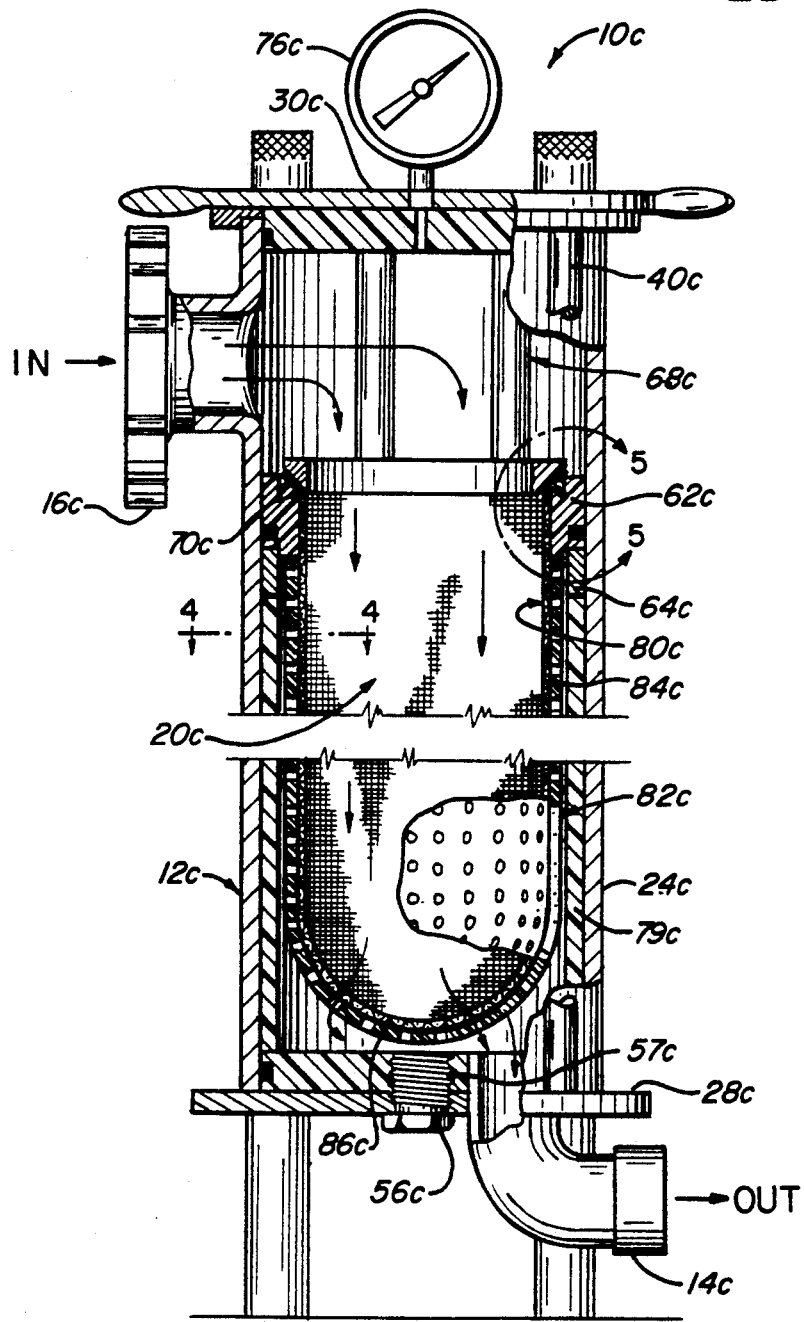
FIG. 3 is a longitudinal section through a modified fluid conditioning device, also a fluid filter, according to the invention.
Figure 4:
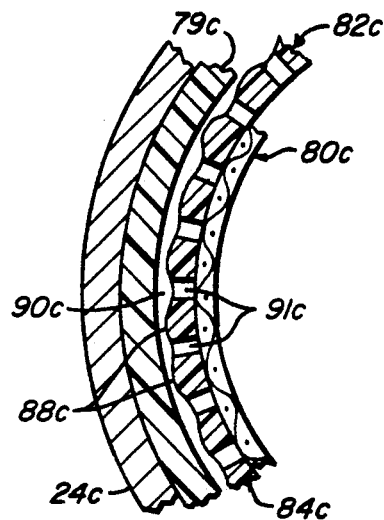
FIG. 4 is an enlarged section taken on line 4—4 in FIG. 3.
Figure 5:
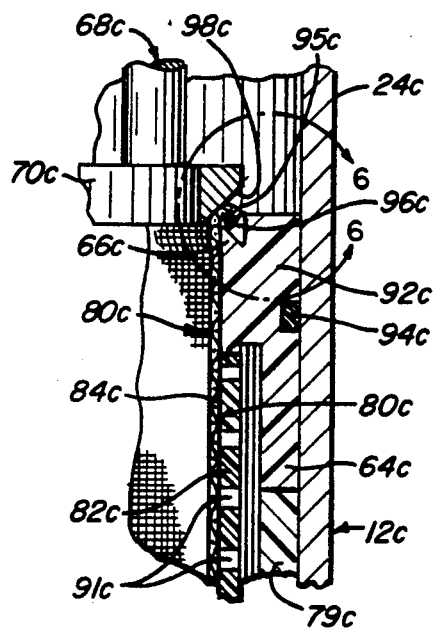
FIG. 5 is an enlargement of the area encircled by the arrow 5—5 in FIG. 3.
Figure 6:
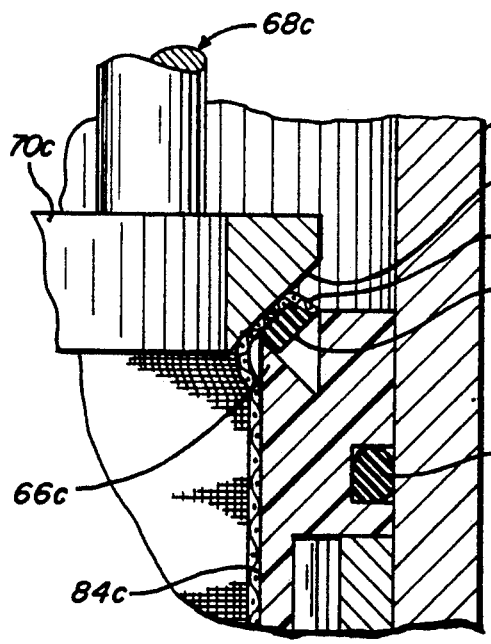
FIG. 6 is a further enlargement of the area encircled by the arrow 6—6 in FIG. 5.

It will now be understood that during operation of the fluid conditioning or filtering device 10, fluid entering the housing 12 through the lower inlet 14 passes upwardly through the fluid passage 18a about the filter cartridge 20 and enters the cartridge through its porous side wall 50. The fluid passes inwardly through the pores in the cartridge filter material 54 to the interior of the central product tube 55 and then emerges from the cartridge through the upper end of the product tube. The fluid exits the filter device through its outlet 16. Solids entrained in the fluid collect on the outside of and within the minute passages within the pores of the filter and are thereby separated from the fluid. The filter cartridge 20 is removable for periodic cleaning or replacement by removing the upper end closure 26 from the housing body 24 and withdrawing the cartridge from the housing through the open upper end of the body. The cartridge hold-down or clamp means 68 are removed from the housing with the upper end closure to free the cartridge for removal from the housing. The upper end closure 30 contains a threaded hole 74 to receive a pressure gauge (FIG. 3) which can be used to assess the cleanliness of the filter cartridge 20, and the presence of vent entrained air. In the absence of a gauge, the hole may be plugged with a screw.

In the cartridge sealing modification of FIG. 2B, the collar 61 on the filter cartridge 20 in FIG. 2A is replaced by a collar 61a having a deformable circumferential lip or flange 61a. The upper end of the filter cartridge side wall 50a is turned outwardly over and secured within an annular recess in the upper side of the flange 60a. The modified filter device of FIG. 2B is otherwise identical to the device of FIGS. 1 and 2A. The hold-down or clamp ring 70 of the modified filter device presses downwardly on the side wall lip and thereby on the flange 60a to urge the flange firmly against the knife sealing edge 66 to indent this edge into the flange, as shown.

Figure 2D:
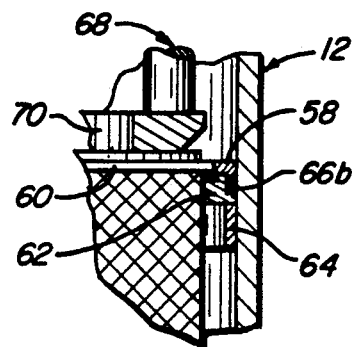
FIG. 2D is a section similar to FIG. 2A through a further modified fluid seal according to the invention which may be utilized in the fluid conditioning device of FIG. 1.

The cartridge sealing modification of FIG. 2C is like that in FIG. 2B except that the cartridge flange 60b in FIG. 2C is relatively hard so that the knife sealing edge 66 on the housing shoulder ring 62 is pressed against, rather than indented into, the underside of the flange. Also, a seal ring 58b is compressed between the cartridge flange 60b and the shoulder ring 62. The cartridge sealing modification of FIG. 2D is like that in FIG. 2A except that the knife sealing edge 66 on the shoulder ring 62 in FIG. 2A is replaced in FIG. 2D by a flat seal ring engaging surface 66b on the shoulder ring parallel to the cartridge flange 60. Seal ring 58 is compressed between the cartridge flange 60 and this flat shoulder ring surface 66b.

The modified fluid conditioning device 10c of FIGS. 3-6 is a filter device which is identical to the filter device 10 of FIGS. 1 and 2A except as noted below. Elements of the modified filter device 10c which correspond to elements of the filter device 10 are designated by the same reference numerals, with the suffix "c", as their corresponding elements in the device 10.

The filter device 10c differs from the filter device 10 only in the following respects. The filter cartridge centering pin 56 and shoulder ring 62 are omitted in the modified filter device 10c. The hole 57c in the lower end plate 28c is closed by a plug 56c. A removable liner sleeve 79c is positioned within the tubular housing body 24c below the housing shoulder 64c. This liner sleeve extends from the should 64c to the bottom end closure 28c and has the same radial thickness as the shoulder so that the shoulder and sleeve provide a relatively smooth continuous cylindrical wall surface within the housing 12c. The upper housing fitting 16c is utilized as a fluid inlet and the lower fitting 14c as a fluid outlet, as indicated by the arrows in the drawings. The housing mounts a pressure gauge 76c, referred to earlier, which may be used to determine the cleanliness of the filter and to determine the presence of entrapped air. The filter housing 12c, like the filter housing 12, includes a tubular body 24c whose open ends are closed by lower and upper end closures 28c, 30c joined by tie rods 40c which are releasable to permit removal of the upper end closure and the hold-down or clamp means 68c on the upper closure.

The fluid conditioner 20c of the filter device 10c is a porous filter bag 80c within a supporting basket 82c. The basket can be considered to be part of the filter housing 12c or part of a filter assembly consisting of the filter bag and basket. The basket 82c has a circumferential side wall 84c and a dome shaped bottom wall 86c integrally joined to the side wall. The outer surface of the basket side wall 84c is shaped to form alternate arcuate ribs 88c and intervening arcuate recesses 90c which extend lengthwise of the basket. Extending through the basket walls between the ribs are a multiplicity of relatively large holes 91c. The holes in the side wall open outwardly to the recesses 90c. Circumferentially surrounding and integrally joined to the upper end of the basket side wall 84c is an external annular shoulder 92c. This basket shoulder is sized in external diameter to fit closely but removably within the tubular housing body 24c above the inner body shoulder 64c and is radially sealed to the surrounding wall of the housing body 24c by a seal ring 94c. Entering the upper side of the basket shoulder 92c is a coaxial annular V-groove like that in shoulder rings 62 of the earlier described embodiments which intersects the inner circumferential surface of the basket shoulder to form a knife sealing edge 66c.

The filter basket 82c is longitudinally dimensioned so that when fully positioned within the housing 12c, the basket shoulder 92c rests on the upper end of the housing shoulder 64c to support the filter basket vertically in the housing 12c with its bottom wall 86c close to or in supporting contact with the housing bottom end closure 28c. The outer diameter of the basket side wall 84c at the crests of the ribs 88c approximates or is just slightly less than the common inner diameter of the housing shoulder 64c and liner sleeve 79c so that the rib crests are located in close proximity to or contact the housing liner sleeve to support the basket side wall 84c radially. The sleeve 79c and basket side wall recesses 90c form flow passages opening inwardly to the inside of the basket and downwardly to the housing outlet 14c.

The filter bag 80c is sized to fit closely within and in contact with the walls of the filter basket 82c. The upper perimeter of the bag is turned outwardly to form an annular lip 95c which extends laterally outward over the knife sealing edge 66c on the basket shoulder 92c. Surrounding the upper mouth of the bag immediately below its lip 96c and between the latter and the knife sealing edge 66c on the filter basket 80c is a resilient seal ring 96c. The filter bag is constructed of a porous material whose pores are sized to pass the fluid to be conditioned, i.e., filtered, and block the passage of solids entrained in the fluid.

The filter basket 82c and filter bag 80c are inserted axially into the filter housing 12c through the open upper end of the tubular housing body 24c after removing the upper end closure 30c of the housing in the same manner as explained earlier in connection with FIG. 1. The upper end closure is then replaced on the housing to close its upper end. When the upper closure is thus replaced on the housing, a beveled peripheral surface 98c on its hold-down or clamp ring 70c presses downwardly and radially outwardly on the filter bag lip 95c to firmly clamp the lip and the seal ring 96c between the clamp ring and knife sealing edge 66c on the filter basket. The seal ring 96c is thereby compressed between the lip and knife sealing edge, and the sealing edge is indented into the seal ring to form a firm fluid tight seal between the housing 12c and the mouth of the filter bag 80c and captivate the seal ring against displacement by a fluid pressure differential across the ring.

During operation of the filter device 10c, fluid enters the filter housing 12c through its upper inlet 16c, passes outwardly through the filter bag 80c and filter basket 82c, and finally emerges from the housing through its lower outlet 14c. Solids separated from the fluid collect within the filter bag which is periodically removed, emptied and reused or replaced by a new bag. The knife sealing edge 66c, bag lip 95c, deformable seal ring 96c, and hold-down or clamp means 68c together form improved seal means of the invention which seal the mouth of the filter bag to the filter housing and thereby force all fluid flow through the filter device to occur through the filter bag. Outward fluid flow through the filter bag creates a pressure differential across and resulting outward forces on the walls of the bag and the filter basket. Outward deflection of the basket walls by this force is prevented by contact of the basket ribs 88c with the housing liner sleeve 79c. The basket, in turn, supports the filter bag against outward expansion by the force of the fluid.

Figure 9:
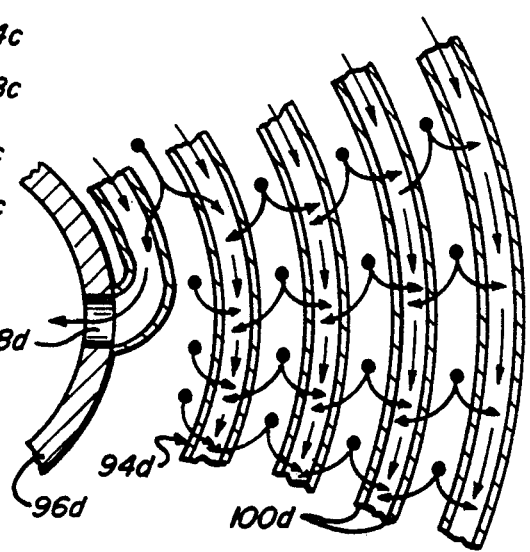
FIG. 9 is an enlargement of the area encircled by the arrow 9—9 in FIG. 8.
Figure 7:
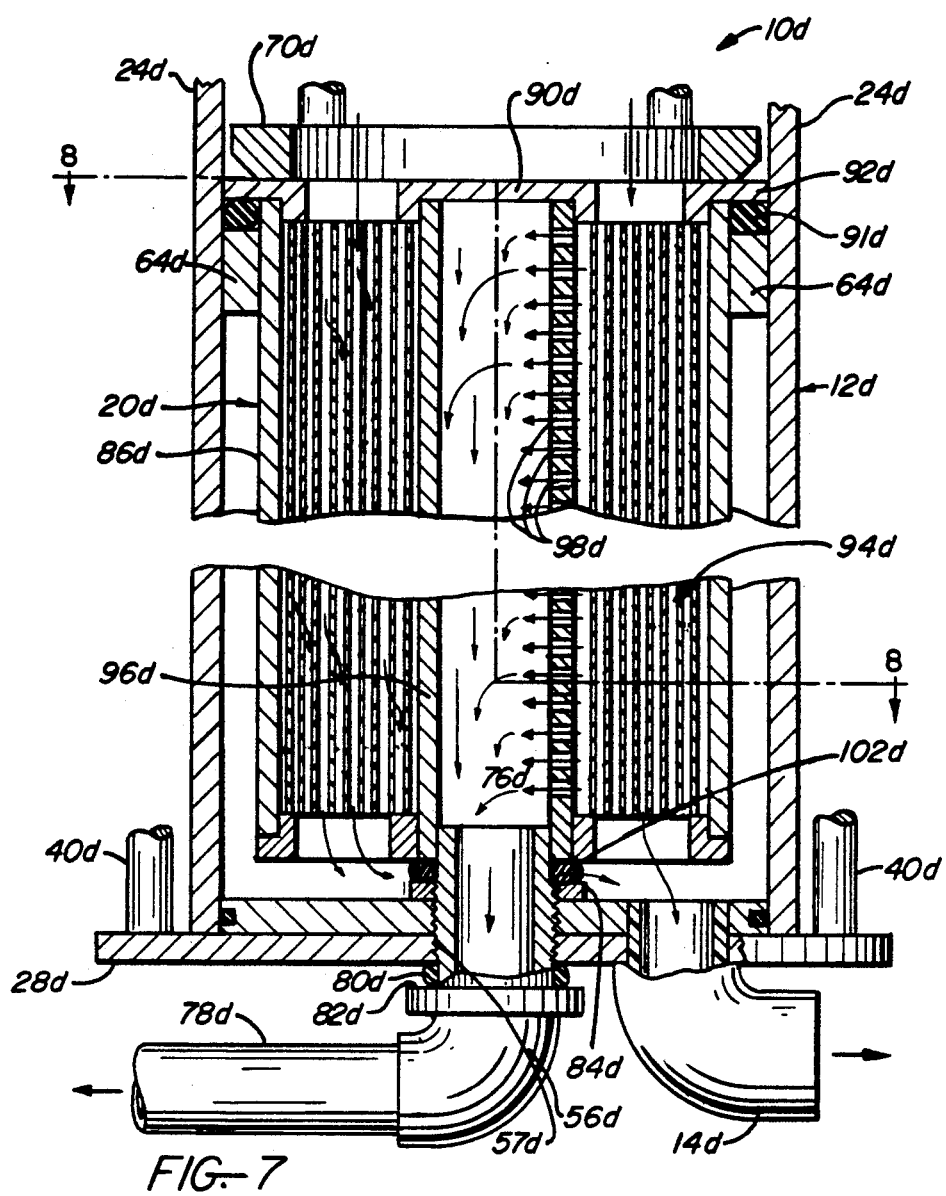
FIG. 7 is a longitudinal section through a further modified fluid conditioning device, in this case a reverse osmosis device, according to the invention.
Figure 8:
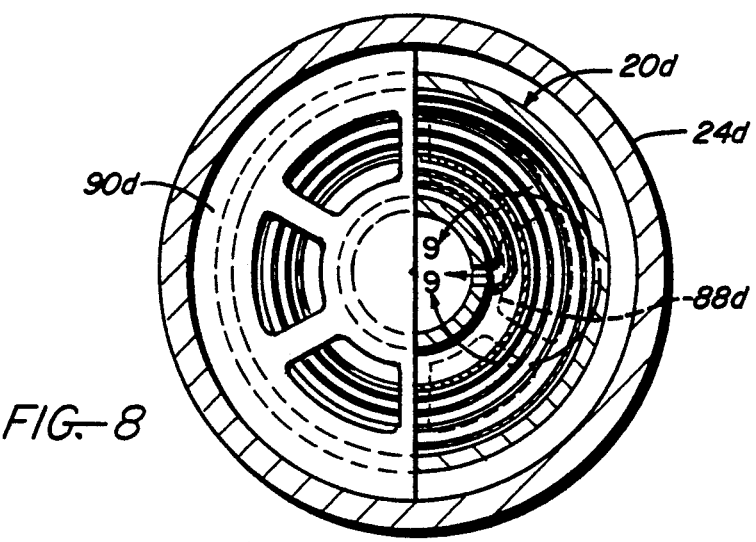
FIG. 8 is a section taken on line 8—8 in FIG. 7.

The modified fluid conditioning device 10d of FIGS. 7–9 is a filter device for removing molecular constituents from a fluid solution by the process of reverse osmosis. The primary application of the device illustrated, for example, is converting saline water to fresh water by removing the saline content of the water. The filter device 10d is identical to the filter device 10 of FIGS. 1 and 2A except as noted in the following description and elements of the filter device 10d corresponding to elements of the filter device 10 are designated by the same reference numerals, with the suffix "d", as their corresponding elements in FIGS. 1 and 2A.

The reverse osmosis filter device 10d differs from the filter device 10 only in the following respects. The upper housing fitting 16 in FIG. 10 (not shown in FIGS. 7–9) is utilized as a fluid inlet for a solution such as saline water to be purified by reverse osmosis and the lower fitting 14d is utilized as a concentrate (i.e., saline concentrate) outlet. The filter cartridge centering pin 56 in the filter device 10 is omitted in the reverse osmosis device 10d and replaced by a purified product fluid outlet adapter 56d. The filter housing 12d is otherwise identical to the filter housing 12, and like the latter housing includes a tubular body 24d whose open ends are closed by lower and upper end closures (only lower end closure 28d shown) joined by tie rods 40d which are releasable to permit removal of the upper end closure. The upper end closure mounts a hold-down or clamp member 70d on its inner side.

The outlet adapter 56d is a generally elbow-shaped fitting having an inlet end or stem 76d and a right angle outlet end 78d. The adapter inlet stem 76d extends axially through central hole 57d in the lower end closure 28d of the housing and mounts a seal ring 80d between the bottom side of the lower closure and an upwardly facing shoulder 82d about the inlet end. Threaded on the inlet stem 76d above the lower end closure 28d is a nut 84d for firmly securing the adapter 56d to the lower closure with the seal ring 80d compressed between lower closure and the adapter shoulder 82d to seal the adapter to the lower closure.

The solids filter cartridge 20 of the filter device 10 is replaced, in the reverse osmosis device 10d, by a reverse osmosis filter cartridge 20d. This cartridge 20d comprises a generally cylindrical body having a cylindrical side wall 86d, and lower and upper end walls 88d, 90d joined to opposite ends of the side wall. These end walls have spider-like shapes and large openings, shown in FIG. 8, through which fluid may freely pass. The upper end wall 90d extends edgewise beyond the upper end of the side wall to form an outwardly projecting flange 92d about the upper end of the cartridge body. Within the interior of the cartridge 20d is a hollow, double-walled semi-permeable membrane 94d of the kind used in the reverse osmosis process. This membrane is helically coiled about a perforate tube 96d extending coaxially through the cartridge, the lower end of this tube is fixed to and extends through the lower cartridge end wall 88d and is internally sized to slidably receive the inlet stem 76d of the outlet adapter 56d. The upper end of the tube 96d is fixed to and closed by the upper cartridge end wall 90d. Extending through the wall of the tube 96d are a plurality of ports 98d arranged in a row extending lengthwise of the tube. As explained below, the inner end of the reverse osmosis membrane 94d is sealed to the wall of the tube 96d in such a way that the interior of the membrane opens to the ports.

The reverse osmosis membrane 98d is conventional and comprises two strip-like semi-permeable walls 100d which are joined at one end and along their longitudinal edges to form a long double-walled envelope which is helically coiled about the tube 96d with the joined ends of the walls outermost. The opposite, inner ends of the membrane walls are sealed to the wall of the tube 96d about the row of ports 98d so that the inner end of the membrane interior opens to the ports, as shown best in FIG. 9, the two membrane walls 100d and the adjacent turns or coils of the membrane are spaced by means not shown to permit fluid flow axially between the coils and inwardly through the coils to the tube ports 98d, as depicted by the arrows in FIGS. 7 and 9. Between this flange and the housing shoulder 64d is a seal ring 91d.

The reverse osmosis cartridge 20d is insertable into and removable from the housing 12d in the same manner as described in connection with the filter cartridge 12 in FIG. 1 and in such a way that the inlet stem 76d of the product fluid outlet adapter 56d enters the lower end of the cartridge tube 96d. About the outlet adapter stem 76d is a seal ring 102d and with the seal ring 91d, is compressed by the downward force exerted on the cartridge by the hold-down or clamp ring 70d when the end closures of the housing 12d are clamped against the ends of the housing body 24d by the tie rods 40d to seal the cartridge to the housing 12d and the tube 96d to the outlet adapter 56d.

During operation of the reverse osmosis device 10d, the fluid to be conditioned, such as saline water, enters through the upper fluid inlet (not shown) and flows downwardly through the reverse osmosis cartridge 20d, between the adjacent coils of the reverse osmosis membrane 94d, to the lower fluid outlet 14d, as depicted by the arrows in FIG. 7. Relatively pure product fluid passes to the interior of the membrane by diffusion through the semi-permeable membrane walls 100d. The remaining concentrate, such as saline concentrate, emerging from the lower end of the cartridge exits the device through the outlet 14d.

It is important to repeat here that while the described embodiments of the invention are all essentially fluid filtering devices for removing matter from a fluid, the invention contemplates within its scope a fluid conditioning device in which its internal fluid conditioner adds matter, such as a chemical, to the fluid instead of or in addition to removing matter from the fluid. For example, the conditioner cartridge 20 in FIG. 1 may be a filter cartridge, as described, and/or may be impregnated with a substance which is added to the fluid passing through the cartridge. It is also evident from the preceding description that the invention provides a basic housing structure or assembly which is adapted to receive any one of several different types of fluid conditioners, such as the filter/additive cartridge of FIG. 1–2A, the filter bag/basket combination of FIGS. 3–6, and the reverse osmosis cartridge of FIGS. 7–9.

Thus there has been shown and described a novel fluid conditioning device which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. A fluid conditioning device comprising:

a housing including a generally tubular body having opposite open ends, a fluid passage extending between said ends, and a wall circumferentially surrounding said passage, removable end closures closing said open ends, respectively, of said body, tie rods joining said end closures for urging said end closures toward one another into fluid sealing relation with the adjacent ends of said body, and a fluid inlet and a fluid outlet opening to said passage adjacent said open ends, respectively, a fluid conditioner within said passage between said inlet and outlet through which fluid may pass from said inlet to said outlet, means for substantially preventing leakage between said fluid conditioner and said housing wall, said means comprising a fixed annular shoulder extending circumferentially about said conditioner and passage and fixed to said housing wall, a conditioner shoulder extending circumferentially about said conditioner between one of said end closures and said fixed shoulder and having a radially outer circumferential surface in close proximity to and facing said housing wall, a groove extending circumferentially around said circumferential surface and opening radially outward toward said housing wall, a seal ring in said groove engaging said housing wall, clamp means mounted on said one end closure opposite said fixed shoulder, and annular lip means on said fluid conditioner extending circumferentially about said conditioner and laterally outward between said conditioner shoulder and clamp means, and wherein said clamp means is urged toward said fixed shoulder when said tie rods are tightened to simultaneously urge said housing end closures into fluid sealing relation with the ends of said housing body and clamp said lip means and said conditioner shoulder between said clamp means and fixed shoulder to form a fluid tight seal between said fluid conditioner and said housing wall.

2. A fluid conditioning device comprising:

a housing including a generally tubular body having an open end, an opposite closed end, a fluid passage extending between said ends, a housing wall circumferentially surrounding said passage, and a hole extending axially through said closed end, a removable plug closing said hole, a removable end closure closing said open end of said body and having a normally inner side, a fluid inlet and a fluid outlet opening to said passage adjacent said body ends, an annular housing shoulder extending circumferentially about and fixed to said passage wall in fluid sealing relation to the wall between said body ends, clamping means including a clamping member on the inner side of said end closure, and means for releasably securing said end closure to said body in fluid sealing relation with the body, fluid conditioning means removably positionable within said passage through said open body end and through which fluid may pass from said inlet to said outlet, and wherein said fluid conditioning means comprises one of the following assemblies (a), (b), (c), (d):

(a) a cartridge assembly including a porous cartridge body through which fluid may pass from said inlet to said outlet, and an annular cartridge shoulder extending circumferentially about and sealed to said cartridge body and extending radially out from said cartridge body, and wherein said cartridge shoulder has an outer circumferential surface facing radially outward, a radially outwardly opening circumferential groove in said circumferential surface and a cartridge seal ring positioned within said groove, and said cartridge assembly is removably positionable within said housing with said cartridge shoulder clamped between said housing shoulder and said clamping member and with said cartridge seal ring engaging said housing wall to seal said cartridge shoulder to said housing wall, (b) a filter assembly including a relatively rigid basket having a body with an open end and a multiplicity of holes through which fluid may freely pass, and an annular basket shoulder extending circumferentially about said open end of and sealed to said basket body and projecting radially out from said basket body, a porous bag within said basket having an open mouth at said open end of the basket and a lip portion about said mouth which extends outwardly over said basket shoulder, (c) means for substantially preventing leakage between said filter assembly and said housing wall, said sealing means comprising an outer circumferential surface of said basket shoulder facing radially outward, a radially outwardly opening circumferential groove in said basket shoulder circumferential surface and a basket seal ring positioned within said latter groove, said filter assembly being removably positionable within said housing with said basket shoulder, said bag lip being clamped between said housing shoulder and said clamping member and said basket seal ring being engaged with said housing wall to seal said basket shoulder to said housing wall, (d) a reverse osmosis cartridge assembly comprising a hollow body, a semi-permeable membrane dividing the cartridge body interior into a first chamber opening through the ends of the cartridge body for fluid flow through said first chamber from said inlet to said outlet, and a second chamber into which fluid can pass from said first chamber by diffusion through said membrane, an annular osmosis cartridge shoulder extending circumferentially about and sealed to said reverse osmosis cartridge body and extending radially out from said reverse osmosis cartridge body, and wherein said reverse osmosis cartridge assembly is removably positionable within said housing with said osmosis cartridge shoulder clamped between said housing shoulder and said clamping member, and said reverse osmosis cartridge includes a product fluid outlet adapter insertable through said housing hole into said reverse osmosis cartridge body after removal of said plug from said hole for conducting fluid from said second cartridge chamber to the exterior of said housing.

3. A fluid conditioning device according to claim 2, wherein:
said opposite end of said housing body is open, and said housing includes a second end closure closing said opposite body end and containing said hole and plug, and means for securing said second closure in fluid sealing relation to said housing body.

4. A fluid conditioning device according to claim 3 wherein:
said filter assembly (b) includes a liner sleeve insertable into said opposite end of said housing body for circumferentially surrounding and radially supporting said basket between said housing shoulder and said opposite end of said housing body, and said basket includes longitudinal recesses through which fluid may pass between the basket and said liner sleeve.

5. A fluid conditioning device according to claim 3 wherein:
each cartridge assembly (a) and (c) includes an annular flange about and sealed to the respective cartridge body and extending radially outward between the respective cartridge body shoulder and said clamp means,
each cartridge assembly (a) and (c) includes a deformable seal between the respective cartridge body shoulder and cartridge flange, and
said filter assembly (b) includes a deformable seal between said basket shoulder and bag lip.

6. A fluid conditioning device according to claim 5 wherein:
said cartridge body shoulder of each cartridge assembly (a) and (c) and said basket shoulder of filter assembly (b) has a relatively sharp annular sealing edge engagable with the respective deformable seal.

7. A fluid conditioning device according to claim 3, wherein:
said means securing said end closures to said housing body comprise tie rods joining said end closures, and said clamping member is movable toward said housing shoulder by tightening of said tie rods to simultaneously secure said end closures to said housing body and secure the respective fluid conditioner in the housing.

8. A fluid conditioning device comprising:
a housing having a fluid inlet, a fluid outlet, a tubular body open at one end, and having an inner cylindrical wall surface, an end closure closing said open end, and means releasably securing said closure to said body, a fluid conditioner within said housing through which fluid flows from said inlet to said outlet and which is removable from and insertable into said housing through said open body end, said housing cylindrical wall surface circumferentially surrounding said conditioner, positioning means for positioning said conditioner longitudinally of said body, means for substantially preventing leakage between said conditioner and said housing wall, said means comprising an annular conditioner shoulder circumferentially surrounding and sealed to said fluid conditioner and having an outer circumferential surface in close proximity to and facing said inner wall surface, a seal groove in said outer shoulder surface extending circumferentially around said conditioner shoulder and opening radially outward toward said inner wall surface, a resilient seal ring positioned in said groove and engaging said inner wall surface, and wherein said positioning means comprises a fixed shoulder extending circumferentially around said inner wall surface on the side of said conditioner shoulder opposite said end closure and in a fixed position longitudinally of said body, and hold down means for holding said conditioner shoulder against said fixed shoulder in a position wherein said conditioner shoulder is disposed in a fixed transverse plane of said body.

9. A fluid conditioning device according to claim 8 wherein:

said conditioner shoulder is a discrete shoulder ring separable from said fluid conditioner, said fluid conditioner has a circumferential lip projecting radially outward over said shoulder ring between the ring and said end closure, and said hold down means is engagable with said lip for pressing said lip against and into fluid sealing relation with said shoulder ring and thereby pressing said shoulder ring against said fixed shoulder.

10. A fluid conditioning device according to claim 9 wherein:

said hold down means is mounted on said end closure and presses said lip against said shoulder ring and said shoulder ring against said fixed shoulder when said end closure is secured to said body.

11. A fluid conditioning device according to claim 9 wherein:

said shoulder ring has an annular knife sealing edge engaging said lip.

12. A fluid conditioning device according to claim 8 wherein:

said hold down means is mounted on said end closure and presses said conditioner shoulder against said fixed shoulder when said end closure is secured to said body.

13. A fluid conditioning device according to claim 8 wherein:

said fluid conditioning device is a fluid filtering device, and said fluid conditioner comprises a replaceable filter cartridge.

14. A fluid conditioning device according to claim 8 wherein:

said fluid conditioning device is a fluid filtering device, said fluid outlet opens to an outlet flow space within said housing between said plane and said one end of said housing body, and said fluid inlet opens to an inlet flow space within said housing between said plane and the opposite end of said body, said fluid conditioner comprises a replaceable filter cartridge having an outlet end through which fluid exits the cartridge, an opposite end, and a circumferentially porous portion between said ends through which fluid enters the cartridge, said conditioner shoulder surrounds said cartridge outlet end, and said circumferentially porous cartridge portion is disposed within said inlet flow space and said cartridge outlet end faces said outlet flow space, whereby fluid entering said inlet flows through said inlet flow space into the cartridge and from said cartridge outlet end through said outlet flow space to said outlet.

15. A fluid filtering device according to claim 14 wherein:

said conditioner shoulder comprises a discrete shoulder ring separate from said cartridge, said filter cartridge has a circumferential lip projecting radially outward over said shoulder ring between the ring and said end closure, and said means for holding said conditioner shoulder against said fixed shoulder comprises hold down means engagable with said lip for pressing said lip against and into fluid sealing relation with said shoulder ring and thereby pressing said shoulder ring against said fixed shoulder.

16. A fluid filtering device according to claim 15 wherein:

said hold down means is mounted on said end closure and presses said lip against and into fluid sealing relation with said shoulder ring when said end closure is secured to said body.

17. A fluid filtering device according to claim 15 wherein:

said shoulder ring has an annular knife sealing edge engaging said lip.

18. A fluid filtering device according to claim 14 wherein:

said hold down means is mounted on said end closure and presses said conditioner shoulder against said fixed shoulder when said end closure is secured to said body.

19. A fluid conditioning device according to claim 8 wherein:

said fluid conditioning device is a fluid filtering device, and said fluid conditioner comprises a replaceable filter bag, and a filter basket containing said bag.

20. A fluid conditioning device according to claim 8 wherein:

said fluid conditioning device is a fluid filtering device, said fluid inlet opens to an inlet flow space within said housing between said plane and said one end of said housing body, and said fluid outlet opens to an outlet flow space within said housing between said plane and the opposite end of said body, said fluid conditioner comprises a filter basket having an open end and a relatively rigid wall containing flow openings, and a replaceable filter bag within said basket having an open mouth at the open end of the basket through which fluid enters the bag and a porous wall engaging the basket wall through which fluid exits the bag, said conditioner shoulder comprises a basket shoulder fixed to and extending radially out from said basket wall in surrounding relation to said open basket end, said filter bag mouth opens to said inlet flow space and said bag and basket walls are disposed within said outlet flow space, whereby fluid entering said inlet flows through said inlet flow space into said filter bag through its open mouth and then through said bag and basket walls and said outlet flow space to said outlet.

21. A fluid filtering device according to claim 20 wherein:

said filter bag has a circumferential lip about said bag mouth projecting radially outward over said basket shoulder between the basket shoulder and said end closure, and said hold down means is engagable with said lip for pressing said lip against and into fluid sealing relation with said basket shoulder and thereby pressing said basket shoulder against said fixed shoulder.

22. A fluid filtering device according to claim 21 wherein:

said hold down means is mounted on said end closure and presses said lip against and into sealing relation with said basket shoulder to press said basket shoulder against said fixed shoulder when said end closure is secured to said body.

23. A fluid filtering device according to claim 21 wherein:

said shoulder ring has an annular knife sealing edge engaging said lip.

24. A fluid filtering device according to claim 20 wherein:

said hold down means is mounted on said end closure and presses said basket shoulder against said fixed shoulder when said end closure is secured to said body.

25. A fluid conditioning device according to claim 8 wherein:

said housing has a product fluid outlet, and said fluid conditioner comprises a reverse osmosis cartridge through which fluid flows from said inlet to said first mentioned outlet and which contains a semi-permeable membrane through which fluid entering the cartridge passes by diffusion to said product fluid outlet.

* * * * *